US012085902B2

(12) United States Patent
Goossen et al.

(10) Patent No.: US 12,085,902 B2
(45) Date of Patent: Sep. 10, 2024

(54) MAPPING DEVICES TO REPRESENTATIONS IN A MODEL

(71) Applicant: SIGNIFY HOLDING B.V., Eindhoven (NL)

(72) Inventors: Jack Goossen, Knegsel (NL); Maulin Dahyabhai Patel, Eindhoven (NL); Lorenzo Feri, Eindhoven (NL); Tim Corneel Wilhelmus Schenk, Eindhoven (NL); Gary Wayne Barnett, Chippenham (GB)

(73) Assignee: SIGNIFY HOLDING B.V., Eindhoven (NL)

( * ) Notice: Subject to any disclaimer, the term of this patent is extended or adjusted under 35 U.S.C. 154(b) by 822 days.

(21) Appl. No.: 15/561,533

(22) PCT Filed: Mar. 16, 2016

(86) PCT No.: PCT/EP2016/055713
§ 371 (c)(1),
(2) Date: Sep. 26, 2017

(87) PCT Pub. No.: WO2016/150795
PCT Pub. Date: Sep. 29, 2016

(65) Prior Publication Data
US 2018/0081329 A1      Mar. 22, 2018

Related U.S. Application Data

(60) Provisional application No. 62/138,482, filed on Mar. 26, 2015.

(51) Int. Cl.
*G06F 30/20* (2020.01)
*G05B 13/04* (2006.01)
*H04L 12/28* (2006.01)

(52) U.S. Cl.
CPC ........ *G05B 13/042* (2013.01); *H04L 12/2807* (2013.01); *H04L 12/2809* (2013.01)

(58) Field of Classification Search
None
See application file for complete search history.

(56) References Cited

U.S. PATENT DOCUMENTS 5,866,992 A * 2/1999 Geiginger ........... H02J 13/0086
340/9.16
6,269,402 B1 * 7/2001 Lin ........................ H04L 29/06
709/227

(Continued)

FOREIGN PATENT DOCUMENTS

CN      103687188 A       3/2014
EP      1966624 B1 *      6/2011

(Continued)

OTHER PUBLICATIONS

Lorenzo Feri et al., English translation of Japanese Patent JP5404811, Feb. 5, 2014, 9 pages (Year: 2014).*

(Continued)

*Primary Examiner* — Andre Pierre Louis

(57) ABSTRACT

Apparatuses (1) for mapping devices (21-29) to representations (31-39) of the devices (21-29) in models comprise displays (11) for displaying representations (31-39), memories (12) for storing triggering information defining triggering procedures for triggering the devices (21-29), inputs (16) for receiving identifying information comprising identifiers from devices (21-29) that have been triggered, and processors (14) for linking the identifiers and the representations (31-39) at the hand of the triggering procedures. The commissioning of devices (21-29) is done faster and more user-friendly. The triggering procedures may define the devices (21-29) to be triggered in a sequence. The processor (14) can then link the identifiers and the representations (Continued)

(31-39) via the sequence. Alternatively the triggering procedures may define unique codes to be allocated to the representations (31-39) and to be provided to the devices (21-29), with the identifying information further comprising the codes. The processor (14) can then link the identifiers and the representations (31-39) via the codes.

6 Claims, 5 Drawing Sheets

(56) References Cited

U.S. PATENT DOCUMENTS

| | | | |
|---|---|---|---|
| 7,551,913 B1* | 6/2009 | Chien | G06F 21/6254 455/411 |
| 8,422,401 B1 | 4/2013 | Choong et al. | |
| 8,539,567 B1* | 9/2013 | Logue | H04L 63/0815 726/7 |
| 8,635,373 B1* | 1/2014 | Supramaniam | H04L 67/42 709/248 |
| 9,374,874 B1* | 6/2016 | Ewing | G08C 17/02 |
| 10,339,795 B2* | 7/2019 | Crafts | H05B 47/19 |
| 2002/0043938 A1* | 4/2002 | Lys | H04L 29/12254 315/149 |
| 2003/0011467 A1 | 1/2003 | Suomela | |
| 2003/0133576 A1* | 7/2003 | Grumiaux | H04L 9/0833 380/279 |
| 2005/0097162 A1* | 5/2005 | Budike | H04L 67/12 709/201 |
| 2006/0049935 A1* | 3/2006 | Giannopoulos | H05B 47/175 340/533 |
| 2008/0068126 A1* | 3/2008 | Johnson | H05B 47/19 340/3.5 |
| 2008/0120707 A1* | 5/2008 | Ramia | H04L 63/0861 726/5 |
| 2008/0231203 A1* | 9/2008 | Budde | H05B 47/185 315/186 |
| 2009/0026966 A1* | 1/2009 | Budde | H05B 47/175 315/152 |
| 2009/0066473 A1 | 3/2009 | Simons | |
| 2010/0214948 A1* | 8/2010 | Knibbe | H04W 4/02 370/254 |
| 2010/0231363 A1* | 9/2010 | Knibbe | H04L 12/2803 340/286.02 |
| 2011/0025469 A1* | 2/2011 | Erdmann | H04L 12/2809 340/10.1 |
| 2011/0031897 A1* | 2/2011 | Henig | H05B 47/18 315/297 |
| 2011/0130851 A1* | 6/2011 | Ferstl | H05B 47/19 700/90 |
| 2011/0252150 A1* | 10/2011 | Chandrabasu | G06F 16/9535 709/228 |
| 2012/0032601 A1* | 2/2012 | Wendt | H05B 47/16 315/154 |
| 2012/0091896 A1* | 4/2012 | Schenk | H05B 47/175 315/132 |
| 2012/0153838 A1* | 6/2012 | Schenk | H05B 47/19 315/151 |
| 2012/0203841 A1* | 8/2012 | Cavalcanti | H04L 67/125 709/204 |
| 2013/0103736 A1* | 4/2013 | Domsalla | H04L 67/143 709/203 |
| 2014/0066062 A1 | 3/2014 | Chen et al. | |
| 2014/0068486 A1 | 3/2014 | Sellers et al. | |
| 2015/0327010 A1* | 11/2015 | Gottschalk | H04W 4/021 455/456.1 |
| 2016/0037293 A1* | 2/2016 | Jovicic | H05B 47/195 398/118 |
| 2017/0059191 A1* | 3/2017 | Nair | F24F 11/523 |

FOREIGN PATENT DOCUMENTS

| | | | |
|---|---|---|---|
| JP | 5404811 | * | 2/2014 |
| WO | 2012168859 | A2 | 12/2012 |
| WO | 2013126965 | A1 | 9/2013 |
| WO | 2015104248 | A1 | 7/2015 |

OTHER PUBLICATIONS

Xue Bai et al., "Understanding techniques of session management for web application courses," 2011, Issues in Information Systems, vol. XII, No. 2, pp. 231-243 (Year: 2011).*

* cited by examiner

Fig. 5

MAPPING DEVICES TO REPRESENTATIONS IN A MODEL

CROSS-REFERENCE TO PRIOR APPLICATIONS

This application is the U.S. National Phase application under 35 U.S.C. § 371 of International Application No. PCT/EP2016/055713, filed on Mar. 16, 2016, which claims the benefit of U.S. Patent Application No. 62/138,482, filed on Mar. 26, 2015. These applications are hereby incorporated by reference herein.

FIELD OF THE INVENTION

The invention relates to an apparatus for mapping devices to representations of the devices in a model. The invention further relates to a system, a method, a computer program product and a medium.

Examples of such an apparatus are controllers and commissioning units. Examples of such a system are management systems and lighting systems.

BACKGROUND OF THE INVENTION

US 2011 0031897 A1 discloses a lighting system and a method of auto-commissioning based on measuring amounts of light and distances. Such measurements may be considered to be relatively disadvantageous.

SUMMARY OF THE INVENTION

It is an object of the invention to provide an improved apparatus. It is a further object of the invention to provide a system, an improved method, a computer program product and a medium.

According to a first aspect, an apparatus is provided for mapping devices to representations of the devices in a model, the apparatus comprising
  a display for displaying a representation,
  a memory for storing triggering information, the triggering information defining a triggering procedure for triggering the devices,
  an input for receiving identifying information from a device that has been triggered, the identifying information comprising an identifier of the device, and
  a processor for linking the identifier and the representation of the device at the hand of the triggering procedure.

An apparatus maps a device to a representation of the device in a model. Examples of such a device are lamps, different kinds of detectors such as light detectors, temperature detectors and smoke detectors, and different kinds of adapters such as light adapters (sun-shielding) and temperature adapters (air-conditioning) etc. Each device has an input for receiving a trigger and an output for in response to a reception of the trigger providing an identifier to the apparatus. The identifier comprises for example an address that is unique within a network comprising all devices.

To be able to map the device to the representation of the device in the model, the apparatus comprises a display for displaying a representation, to give a user an overview of one or more of the devices in the network. The apparatus further comprises a memory for storing triggering information. This triggering information defines a triggering procedure for triggering the devices. The device can be triggered through the trigger generated by an arrangement for triggering the device. Such an arrangement may form part of the apparatus or not. The trigger may be provided to the device wirelessly, for example via an infrared signal, a radio-frequency signal, an optical signal or a movement, and may be provided to the device in a wired way, for example via an electrical cable or an optical cable etc. The apparatus further comprises an input for receiving identifying information from the device. This identifying information comprises the identifier of the device. The identifier may be provided to the apparatus wirelessly, for example via an infrared signal, a radio-frequency signal or an optical signal, and may be provided to the apparatus in a wired way, for example via an electrical cable or an optical cable etc. The trigger and the identifier may be provided via a same channel in an identical way, via different channels in an identical way or via different channels in different ways. The apparatus further comprises a processor for linking the identifier and the representation of the device at the hand of the triggering procedure.

So, before the triggering is started, a triggering procedure is defined. The apparatus knows what triggering procedure has been selected and how the devices are going to respond to this triggering procedure, and, for example in which order. As a result, the devices can be mapped easily to their representations in the model, without amounts of light and distances needing to be measured. This is a great improvement.

The mapping of devices to their representations in a model is also known as the commissioning of the devices, or as a (localization) part of such a commissioning procedure. The displaying of the representation of the device may comprise the displaying of all representations that represent an entire set of devices in the network and may comprise the displaying of a subset of representations that represent a subset of devices in the network. Usually, each device is represented by its own unique representation. A unique representation is unique within the entire set of devices.

An embodiment of the apparatus is defined by the triggering procedure defining the devices to be triggered in an order.

According to a first possibility, the triggering procedure defines the devices to be triggered in an order or in a sequence. This way, the devices are triggered in the order or in the sequence. The devices respond to the triggers by returning the identifiers, again in the order or in the sequence. Hereby it is assumed that a delay between a reception of a trigger and a provision of an identifier is substantially identical in each device. So, the identifying information in this case comprises the identifier and some order information and/or timing information.

An embodiment of the apparatus is defined by the processor being configured to link the identifier and the representation via the order. The processor can easily link the identifier to the representation in case both are coupled by their order information and/or timing information.

An embodiment of the apparatus is defined by the processor being configured to generate the triggering information. The processor may generate the triggering information to facilitate a user, possibly in response to an instruction from the user.

An embodiment of the apparatus is defined by the memory being configured to receive the triggering procedure from a user. A user may also generate the triggering information or similar information himself or herself. The similar information needs to be converted into the triggering information by the apparatus.

An embodiment of the apparatus is defined by the triggering procedure defining unique codes to be allocated to the representations and defining the codes to be provided to the devices, and the identifying information further comprising a code provided to the device.

According to a second possibility, the triggering procedure defines unique codes to be allocated to the representations and defines these codes to be provided to the devices, possibly via the triggers. This way, the devices are informed of the unique codes. A device responds to the trigger by returning a combination of the identifier and the code to the apparatus. So, the second information in this case comprises this combination of the identifier and the unique code.

A unique code is unique within an entire set of devices in a network in case the entire set of devices is to be triggered in one and the same triggering procedure. A unique code is unique within a subset of devices in a network in case the subset of devices is to be triggered in one and the same triggering procedure and another subset of devices is to be triggered in another triggering procedure.

An embodiment of the apparatus is defined by the processor being configured to link the identifier and the representation via the code. The processor can easily link the identifier to the representation in case both are coupled by their unique code.

An embodiment of the apparatus is defined by the processor being configured to generate the triggering information. The processor may generate the triggering information to facilitate a user, possibly in response to an instruction from the user.

An embodiment of the apparatus is defined by the memory being configured to receive the triggering procedure from a user. A user may also generate the triggering information or similar information himself or herself. The similar information needs to be converted into the triggering information by the apparatus.

An embodiment of the apparatus is defined by the triggering procedure being configured to be indicated on the display. The indication of the triggering procedure on the display will facilitate the user.

According to a second aspect, a system is provided comprising the apparatus and further comprising the devices.

An embodiment of the system is defined by further comprising an arrangement for triggering the devices.

According to a third aspect, a method is provided for mapping devices to representations of the devices in a model, a representation being configured to be displayed on a display, the method comprising the steps of storing triggering information, the triggering information defining a triggering procedure for triggering the devices, receiving identifying information from a device that has been triggered, the identifying information comprising an identifier of the device, and linking the identifier and the representation of the device at the hand of the triggering procedure.

According to a fourth aspect, a computer program product is provided for, when run via a computer, performing the steps of the method as defined above. An example of such a computer program product is a tool.

According to a fifth aspect, a medium is provided for storing and comprising the computer program product as defined above.

An insight is that auto-commissioning is relatively complex and either relatively expensive to implement or relatively unreliable. A basic idea is that a memory should store triggering information defining a triggering procedure for triggering devices and that a processor should link identifiers and representations of the devices at the hand of the triggering procedure.

A problem to provide an improved apparatus has been solved. A further advantage is that the commissioning of devices can be done faster and more user-friendly and that it is less costly to implement.

These and other aspects of the invention will be apparent from and elucidated with reference to the embodiments described hereinafter.

BRIEF DESCRIPTION OF THE DRAWINGS

In the drawings:
FIG. 5 shows a second triggering procedure.

DETAILED DESCRIPTION OF EMBODIMENTS

Figure 1:
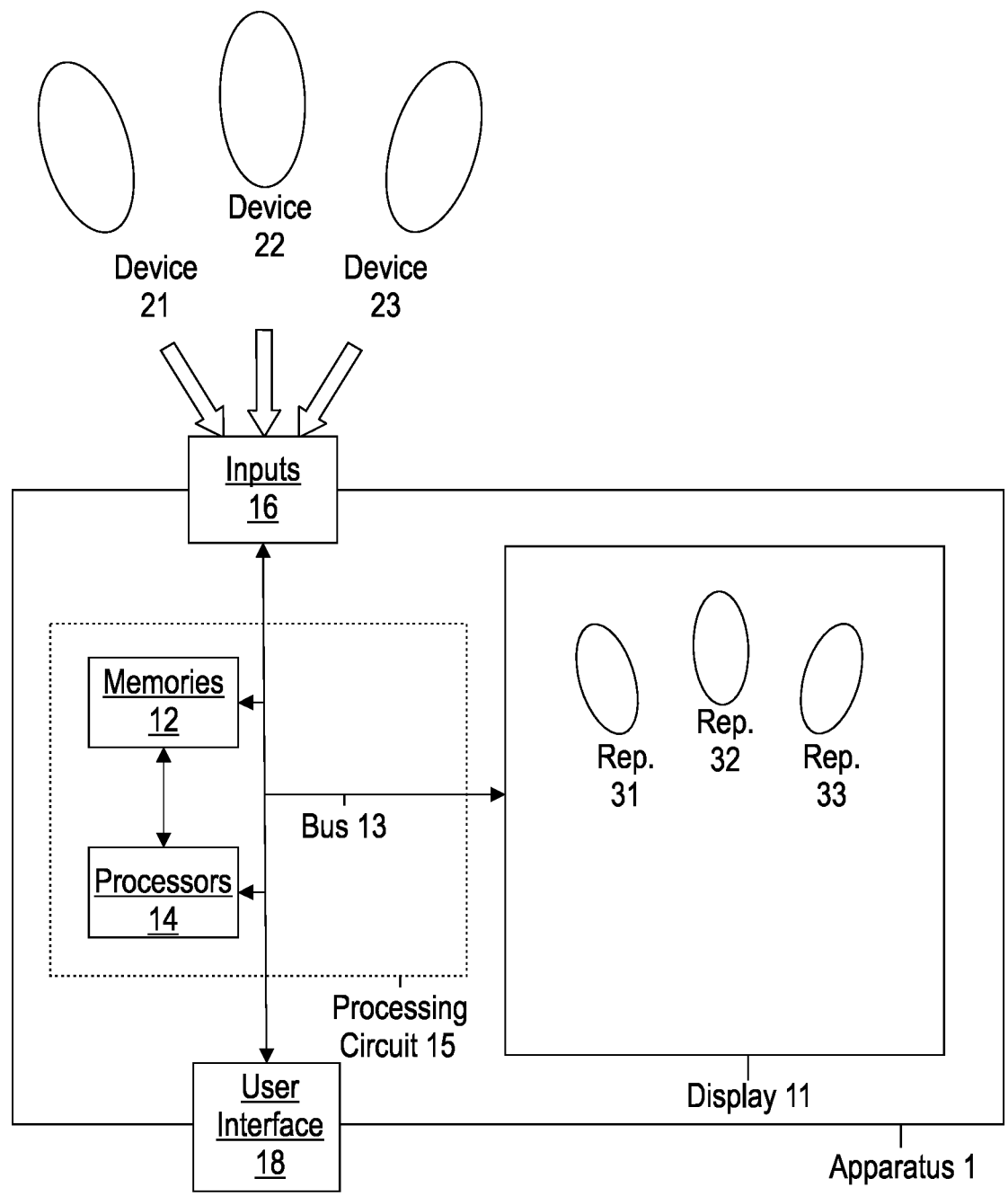
FIG. 1 shows a first embodiment of an apparatus.

In the FIG. 1, a first embodiment of an apparatus 1 is shown. 1. The apparatus 1, such as for example a controller or a commissioning unit, maps devices 21-23 to representations 31-33 of the devices 21-23 in a model. Thereto, the apparatus 1 comprises a display 11 for displaying a representation 31-33 to a user. The apparatus 1 further comprises a memory 12 for storing triggering information. The triggering information defines a triggering procedure for triggering the devices 21-23. The apparatus 1 further comprises an input 16 for receiving identifying information from a device 21-23 that sends this identifying information to the apparatus 1 after being triggered. The identifying information comprises an identifier of the device 21-23. The apparatus 1 further comprises a processor 14 for linking the identifier and the representation 31-33 of the device 21-23 at the hand of the triggering procedure.

The apparatus 1 may further comprise a user-interface 18 for allowing a user to enter information into the apparatus 1. The apparatus 1 may further comprises a processing circuit 15 comprising the memory 12 and the processor 14 interconnected via a bus 13 that is further connected to the display 11, the input 16 and the user-interface 18, but many alternative processing circuits 15 comprising the memory 12 and the processor 14 will be possible too. The memory 12 may be any kind of memory and the processor 14 may be any kind of processor.

The apparatus 1 functions as follows. At a start, the representations 31-33 of the devices 21-23 such as lamps, detectors and adapters etc. are stored in the memory 12 and are displayed via the display 11. The devices 21-23 themselves are located at different locations. The apparatus 1 is designed to map each device 21-23 to a representation 31-33 of the device 21-23 in a model. Each device 21-23 has an input for receiving a trigger and an output for in response to a reception of the trigger providing an identifier to the input 16 of the apparatus 1. The identifier comprises for example an address that is unique within a network comprising all devices 21-23.

In a first prior art situation, a device 21-23 is mapped to a representation 31-33 of the device 21-23 by triggering the device 21-23 and by letting a user, who for example sees or hears or otherwise knows which device 21-23 has been triggered, instruct the apparatus 1, for example via the user-interface 18, which representation 31-33 belongs to the triggered device 21-23.

In a second prior art situation, a device 21-23 is mapped to a representation 31-33 of the device 21-23 in a more automatic way, as disclosed in US 2011 0031897 A1 that shows a method of auto-commissioning based on measuring amounts of light and distances. Such measurements may be considered to be relatively disadvantageous.

According to the invention, before the triggering is started, a triggering procedure is defined. Thereto, triggering information defining this triggering procedure is stored in the memory 12. The apparatus 1 then knows what triggering procedure has been selected and how the devices 21-23 are going to respond to this triggering procedure. As a result, the devices 21-23 can be mapped easily to their representations 31-33 in the model, without amounts of light and distances needing to be measured.

Figure 4:
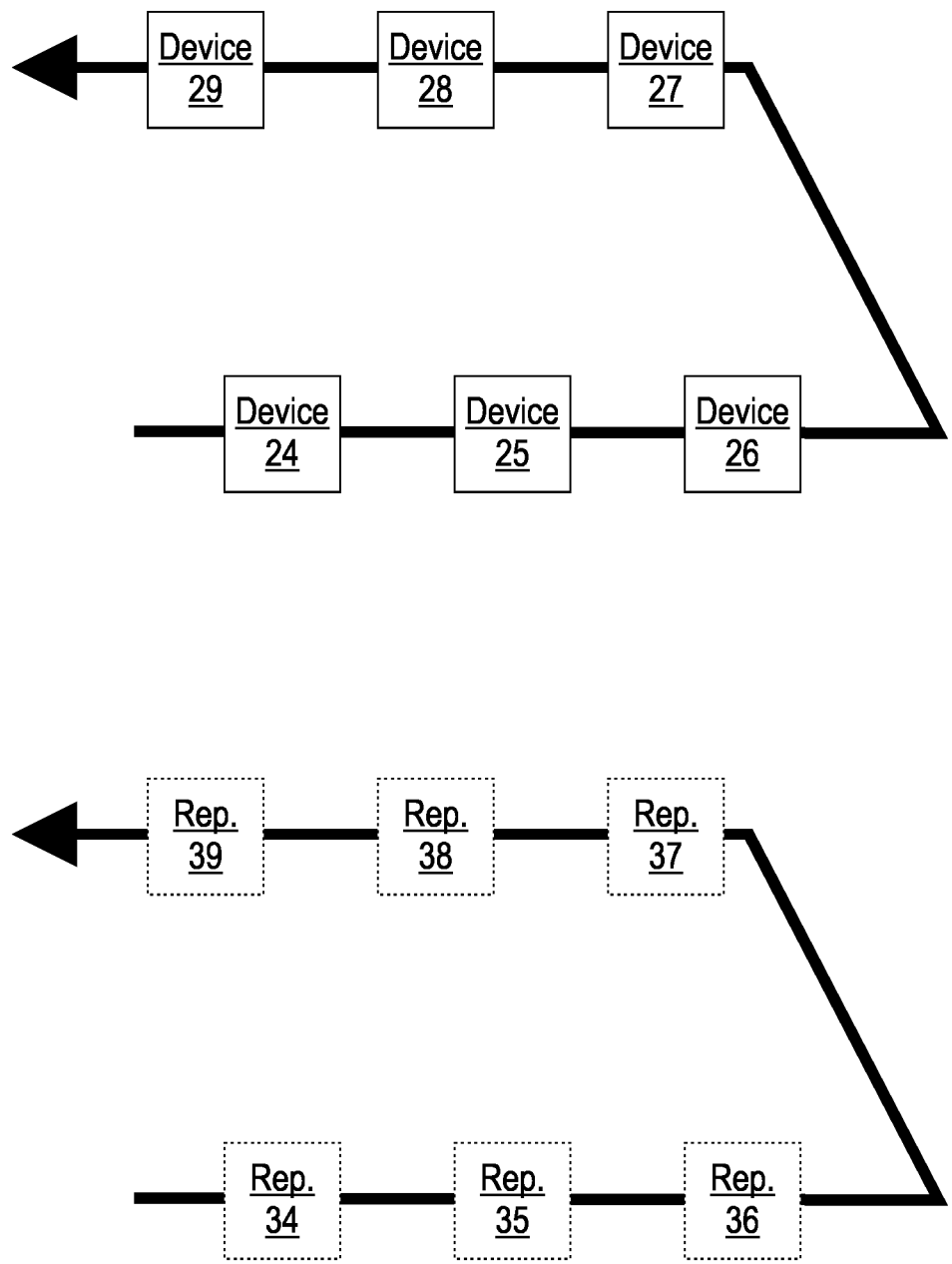
FIG. 4 shows a first triggering procedure.

The triggering procedure may define the devices 21-23 to be triggered in an order (as also shown in and discussed at with reference to FIG. 4). And the processor 14 may be configured to link the identifier and the representation 31-33 via the order. In case the device 21 is triggered firstly, the identifying information comprising the identifier from the device 21 will arrive firstly at the input 16, and the processor 14 can link this identifier to the representation 31. In case the device 22 is triggered secondly, the identifying information comprising the identifier from the device 22 will arrive secondly at the input 16, and the processor 14 can link this identifier to the representation 32. In case the device 23 is triggered thirdly, the identifying information comprising the identifier from the device 23 will arrive thirdly at the input 16, and the processor 14 can link this identifier to the representation 33.

More specifically, as a further refinement of FIG. 4 embodiment, the following is considered. To avoid errors in the commissioning process a display device such as a PDA can be used. The display device carries the installation map in the background and is linked to a server, e.g. a DHCP server over a wired or wireless connection. The DHCP server can be on-site or off-site. Alternatively, the DHCP server could be part of the display device. A user puts each device (lamps, sensors . . . ) into commissioning mode based on an order represented on the map of the PDA. Devices can be set into 'commissioning mode' using a button press or via an IR remote or just by power on.

When a given device is set into 'commissioning mode', it immediately reports to the network controller, for example to report its MAC address. The network controller records it in the order it was received. Since there is a unique mapping between the logical ID (hence the order of commissioning a device) and a given physical location, the network controller maps the MAC address to the position where it is installed based on the order it which it is received. For example, whenever the DHCP server receives a request for an IP address it sends a message to the PDA. PDA can show the location of the commissioned device on the installation map and requests the user to confirm whether the location shown on screen matches with actual location of the device. Optionally, the commissioned device can provide an audio/visual indication (e g blinking or beep) to the user for correct identification. If user confirms the location then the PDA sends an affirmative response to the DHCP server which in turn sends the DHCP configuration parameters to the requesting device.

Figure 5:
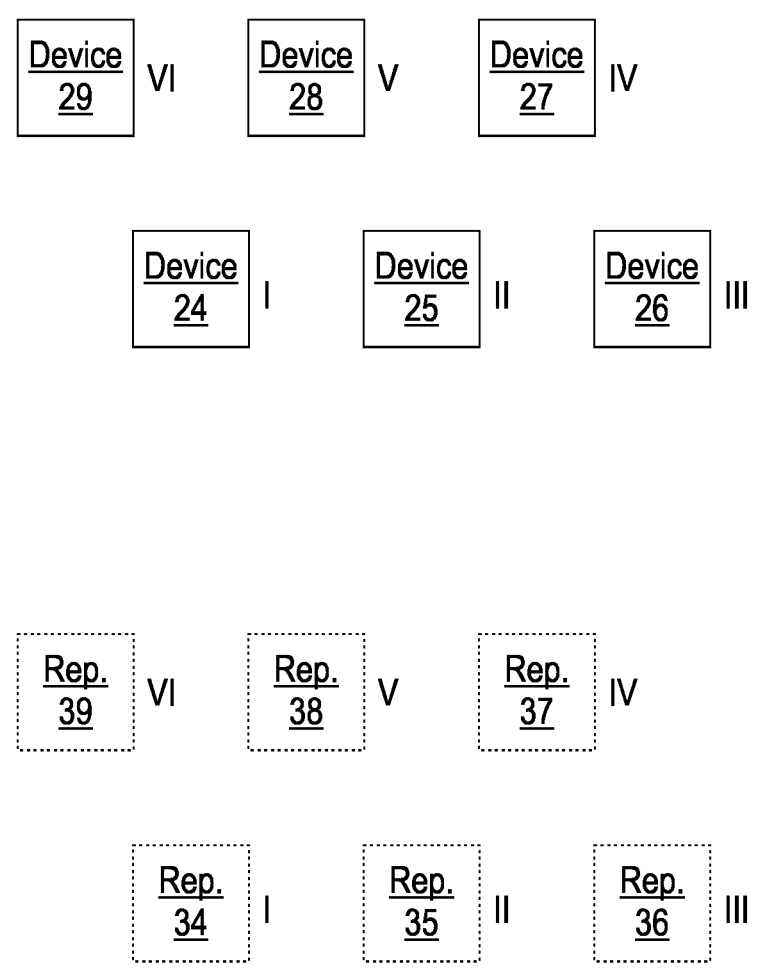

The triggering procedure may define unique codes to be allocated to the representations 31-33 and may define the codes to be provided to the devices 21-23 (as also shown in and discussed at the hand of the FIG. 5). The identifying information may then further comprise the codes as provided to the devices 21-23. And the processor 14 may be configured to link the identifiers and the representations 31-33 via the codes. In case the device 21 is triggered while receiving or having received a first code, the identifying information comprising the identifier from the device 21 and the first code will arrive at the input 16, and the processor 14 can link this identifier to the representation 31 by using the first code. In case the device 22 is triggered while receiving or having received a second code, the identifying information comprising the identifier from the device 22 and the second code will arrive at the input 16, and the processor 14 can link this identifier to the representation 32 by using the second code. In case the device 23 is triggered while receiving or having received a third code, the identifying information comprising the identifier from the device 23 and the third code will arrive at the input 16, and the processor 14 can link this identifier to the representation 33 by using the third code.

Each device 21-23 can be triggered through a trigger generated by an arrangement for triggering the device 21-23. Such an arrangement may form part of the apparatus 1, as shown in and discussed at the hand of the FIG. 2, or not, as shown in and discussed at the hand of the FIG. 3. The trigger may be provided to the device 21-23 wirelessly, for example via an infrared signal (in case the device 21-23 is provided with an infrared receiver), a radio-frequency signal (in case the device 21-23 is provided with a radio-frequency receiver), an optical signal (in case the device 21-23 is provided with an optical receiver) or a movement (in case the device 21-23 is provided with a movement detector), and may be provided to the device in a wired way, for example via an electrical cable or an optical cable etc.

The identifier may be provided to the apparatus 1 wirelessly, for example via an infrared signal (in case the input 16 comprises an infrared receiver), a radio-frequency signal (in case the input 16 comprises an radio-frequency receiver) or an optical signal (in case the input 16 comprises an optical receiver), and may be provided to the apparatus in a wired way, for example via an electrical cable or an optical cable etc.

In the FIG. 1, the trigger is for example provided to the device 21-23 through a movement (in which case the device 21-23 needs to be provided with a movement detector) or through a switch (in which case the device 21-23 needs to be provided with such a switch) etc.

Figure 2:
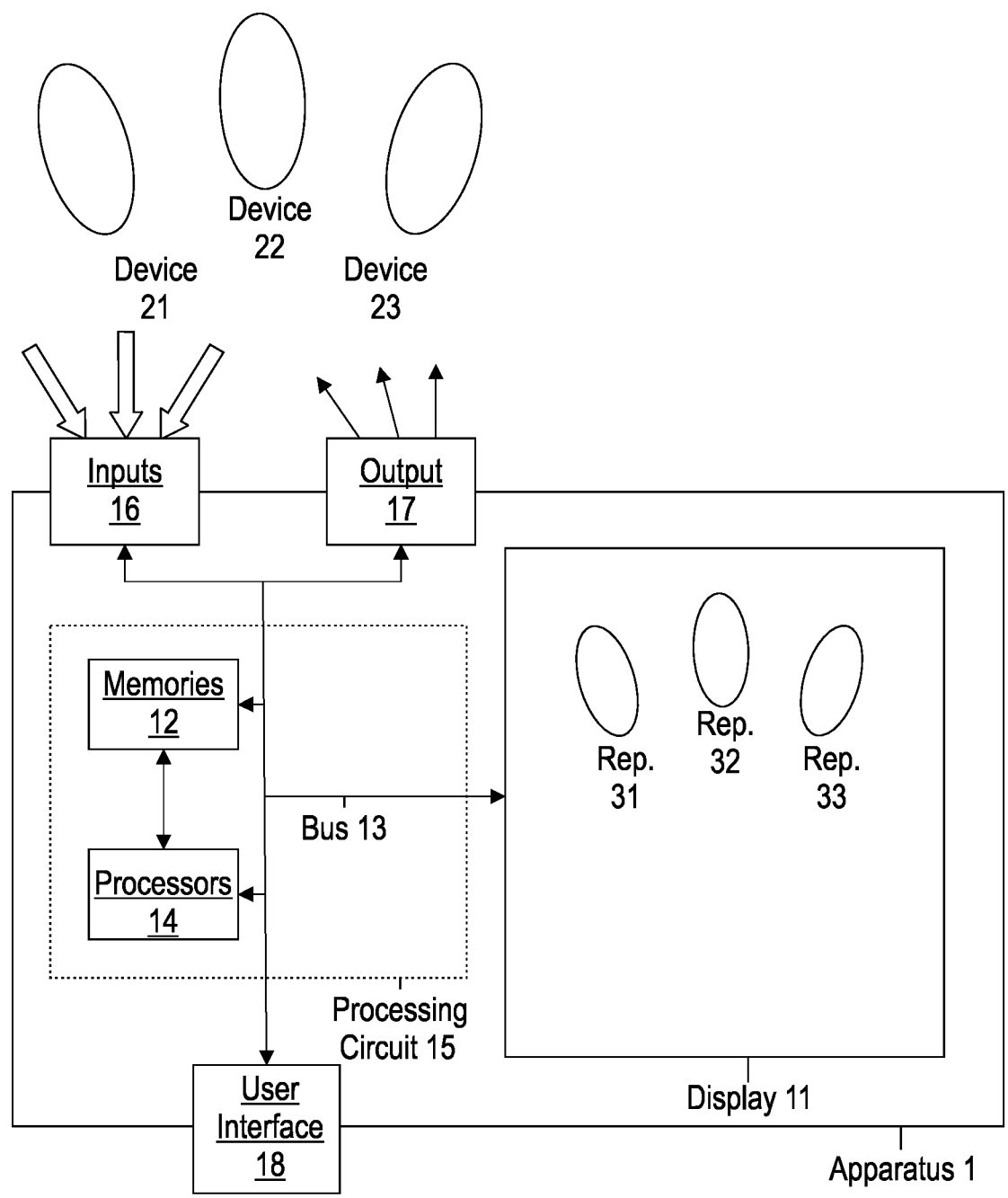
FIG. 2 shows a second embodiment of an apparatus.

In the FIG. 2, a second embodiment of an apparatus 1 is shown, that differs from the first embodiment in that the apparatus 1 further comprises an output 17 coupled to the bus 13 for providing the triggers to the devices 21-23. So, in the FIG. 2, the trigger is for example provided to the device 21-23 through a wireless signal or through a wired signal etc.

Figure 3:
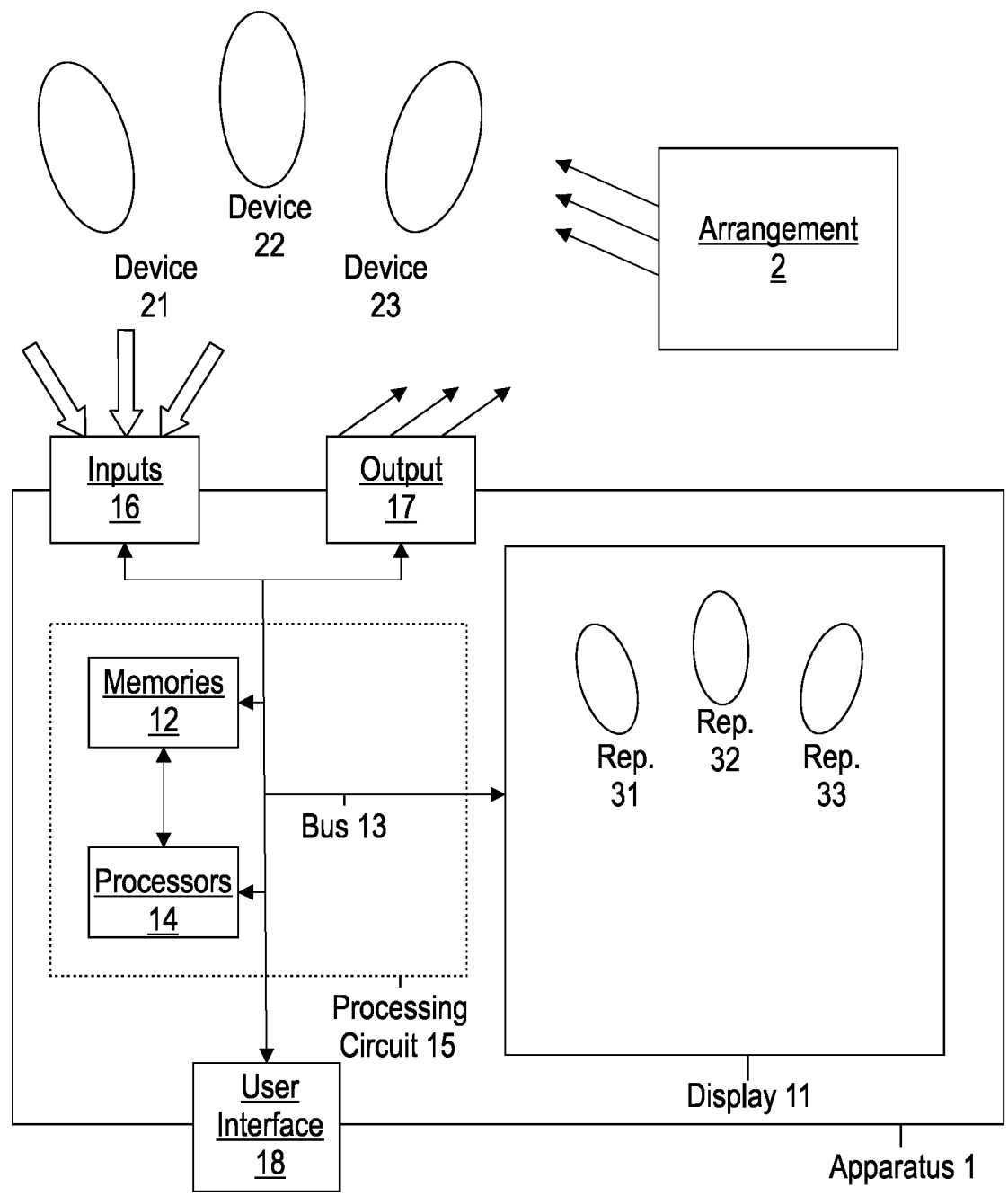
FIG. 3 shows a third embodiment of an apparatus.

In the FIG. 3, a third embodiment of an apparatus 1 is shown, that differs from the first embodiment in that the apparatus 1 further comprises an output 17 coupled to the bus 13 for providing one or more instructions to an arrangement 2 for providing the triggers to the devices 21-23. So, in the FIG. 3, the trigger is for example provided to the device 21-23 via a separate arrangement 2 through a wireless signal or through a wired signal etc. Via the one or more instructions, the order or the codes are to be provided to the arrangement 2. The arrangement 2 provides the trigger to the device 21-23 through a wireless signal or through a wired signal etc.

In the FIG. 4, a first triggering procedure is shown. This first triggering procedure defines devices 24-29 to be triggered in an order, with this order and the representations 34-39 of the devices 24-29 being known in the apparatus 1.

In the FIG. 5, a second triggering procedure is shown. This second triggering procedure defines unique codes I-VI to be allocated to representations 34-39 and defines the codes I-VI to be provided to the devices 24-29, for example via the triggers, with the identifying information further comprising the codes I-VI as provided to the devices 24-29.

For both triggering procedures, the processor 14 may be configured to generate the triggering information, possibly in response to an instruction from a user. The memory 12 may be configured to receive the triggering procedure from a user. For example for a display 11 in the form of a touch screen, a user may enter the order for triggering the devices 21-29 by touching the screen. Preferably, one or more of the triggering procedures may be indicated on the display 11, to assist a user.

The devices 21-29 may be devices in a network coupled to a network controller. Such a network may have a ring structure or a star structure or a mixture of both or any other structure. So, each device 21-29 may be coupled to the network controller and/or to another device etc. The apparatus 1 may form (part of) such a network controller or may be coupled to such a network controller or may be used fully independently from such a network controller.

A system comprising the apparatus 1 and further comprising the devices 21-29 may be a building management system in which case the devices 21-29 can be any kind of building devices and may be a lighting system in which case the devices 21-29 may be any kind of lamps. For example in a building or on the street, many lamps need to be controlled, often differently per group of lamps, and to create/manage such groups, the apparatus 1 and/or a corresponding software tool can be very helpful.

A model may comprise a plan or a map, without having excluded other kinds of models. Preferably, the model is also shown on the display 11. First and second elements may be coupled indirectly via a third element and may be coupled directly without the third element being in between.

Summarizing, apparatuses 1 for mapping devices 21-29 to representations 31-39 of the devices 21-29 in models comprise displays 11 for displaying representations 31-39, memories 12 for storing triggering information defining triggering procedures for triggering the devices 21-29, inputs 16 for receiving identifying information comprising identifiers from devices 21-29 that have been triggered, and processors 14 for linking the identifiers and the representations 31-39 at the hand of the triggering procedures. The commissioning of devices 21-29 is done faster and more user-friendly. The triggering procedures may define the devices 21-29 to be triggered in a sequence. The processor 14 can then link the identifiers and the representations 31-39 via the sequence. Alternatively the triggering procedures may define unique codes to be allocated to the representations 31-39 and to be provided to the devices 21-29, with the identifying information further comprising the codes. The processor 14 can then link the identifiers and the representations 31-39 via the codes.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for commissioning devices in an installation by mapping identifiers of devices to representations of the devices in an installation plan, the apparatus comprising:
    a display configured to display a representation of the devices in the installation plan;
    a memory configured to store triggering information, the triggering information defining a triggering procedure for triggering the devices for commissioning, the triggering procedure defining the devices to be triggered in a predetermined order and defining unique codes to be provided to the devices, the unique codes being unique to each of the devices, wherein the display is configured to display the triggering procedure indicating the predetermined order in which the devices are to be triggered for commissioning in accordance with the triggering procedure, the memory being configured to receive the triggering procedure from a user;
    an input configured to receive identifying information from the devices that have been triggered, the identifying information comprising an identifier of the respective triggered device and a unique code of the unique codes; and
    a processor configured to link the respective received identifier of the corresponding triggered device to the corresponding representation of the device in the predetermined order of the triggering procedure, and the processor being configured to link the identifier and the representation via the unique code.

2. The apparatus as defined in claim 1, wherein the processor is configured to generate the triggering information.

3. The apparatus as defined in claim 1, wherein the triggering procedure is configured to be indicated on the display.

4. The apparatus as defined in claim 1, wherein each device that has been triggered is not configured to turn on or off a light source in response to the triggering information.

5. A method for commissioning devices in an installation by mapping identifiers of devices to representations of the devices in an installation plan, a representation of devices in the installation plan being configured to be displayed on a display, the method comprising the steps of:
    storing triggering information on a memory, the triggering information defining a triggering procedure for triggering the devices for commissioning, the triggering procedure defining the devices to be triggered in a predetermined order and defining unique codes to be provided to the devices, the unique codes being unique to each of the devices, the triggering procedure being received from a user;
    displaying the triggering procedure on the display indicating the order in which the devices are to be triggered in accordance with the triggering procedure;
    receiving identifying information from the devices that has been triggered, the identifying information comprising an identifier of the respective triggered device and a unique code of the unique codes; and linking the respective received identifier of the corresponding triggered device to the corresponding representation of the device in the predetermined order of the triggering procedure, and linking the identifier and the representation via the unique code.

6. A non-transitory computer-readable medium on which are stored a plurality of non-transitory computer-readable instructions that when executed on a processor are configured to perform the steps comprising the method as defined in claim 5.

* * * * *